United States Patent
Nozawa

[11] Patent Number: 5,267,084
[45] Date of Patent: Nov. 30, 1993

[54] COMPACT, FAST ZOOM LENS SYSTEM

[75] Inventor: Toshihide Nozawa, Tokyo, Japan

[73] Assignee: Olympus Optical Co., Ltd., Tokyo, Japan

[21] Appl. No.: 918,002

[22] Filed: Jul. 24, 1992

[30] Foreign Application Priority Data

Jul. 24, 1991 [JP] Japan .................. 3-182749

[51] Int. Cl.$^5$ .............................. G02B 15/14
[52] U.S. Cl. ..................... 359/689; 359/683
[58] Field of Search ............ 359/676, 686, 689, 791, 359/683, 784

[56] References Cited

U.S. PATENT DOCUMENTS

| | | | |
|---|---|---|---|
| 4,398,808 | 8/1983 | Fujibayashi | 359/686 |
| 4,629,294 | 12/1986 | Tanaka et al. | 359/686 |
| 4,682,860 | 7/1987 | Tanaka et al. | 359/692 |
| 4,773,744 | 9/1988 | Yamanashi | 359/689 |
| 4,952,038 | 8/1990 | Ito | 359/689 |
| 4,978,204 | 12/1990 | Ito | 359/689 |
| 4,983,027 | 1/1991 | Kojima et al. | 359/689 |

FOREIGN PATENT DOCUMENTS 56-128911 10/1981 Japan .
57-201213 12/1982 Japan .
1252916 10/1989 Japan .

Primary Examiner—Bruce Y. Arnold
Assistant Examiner—David R. Parsons
Attorney, Agent, or Firm—Cushman, Darby & Cushman

[57] ABSTRACT

The present invention provides a zoom lens system comprising, in order from the object side, a first lens unit G1 having a positive refracting power; a second lens unit G2 including a front subunit having at least one negative lens and a rear subunit having at least one negative lens and at least two positive lenses located more closely to the image side than said negative lens and having a positive refracting power as a whole, said front and rear subunits having a positive composite power; and a third lens unit G3 having a negative refracting power; said first, second and third lens units including gaps between them, which are variable for zooming from the wide to tele position. This compact, three-unit zoom lens system has a zoom ratio of about 2 or more but, nonetheless, has a small F-number or is fast 3 Claims, 8 Drawing Sheets

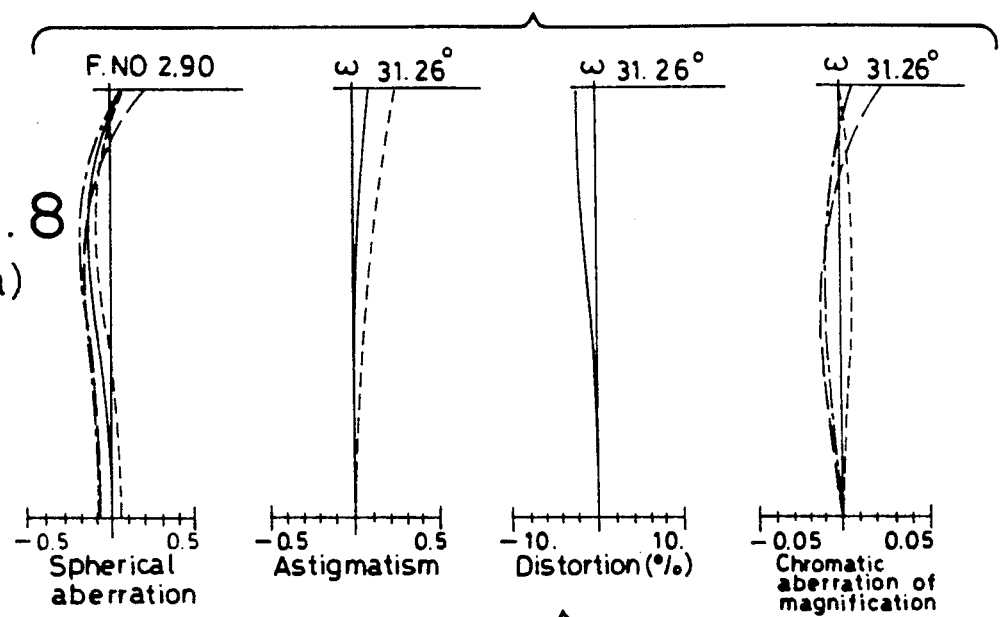
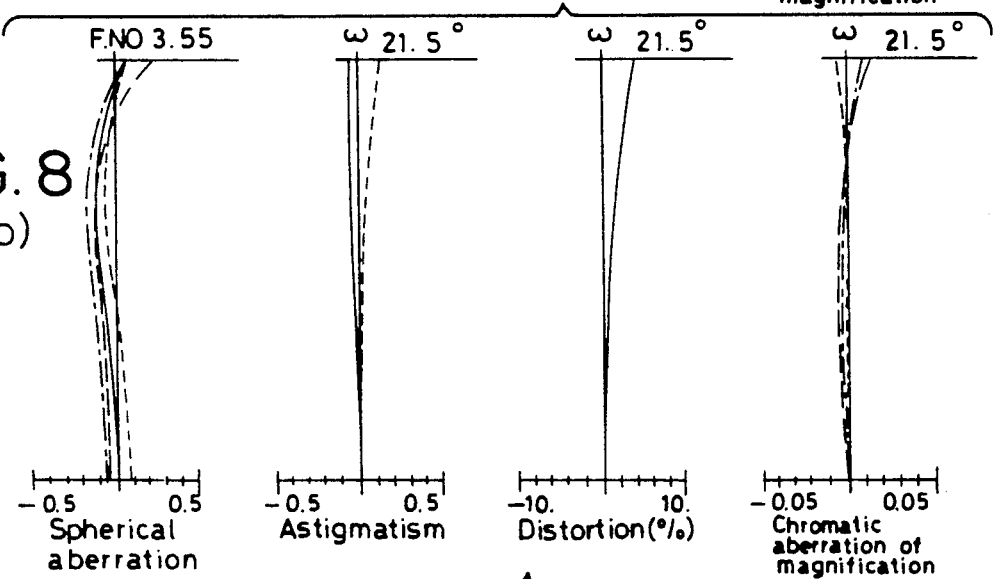
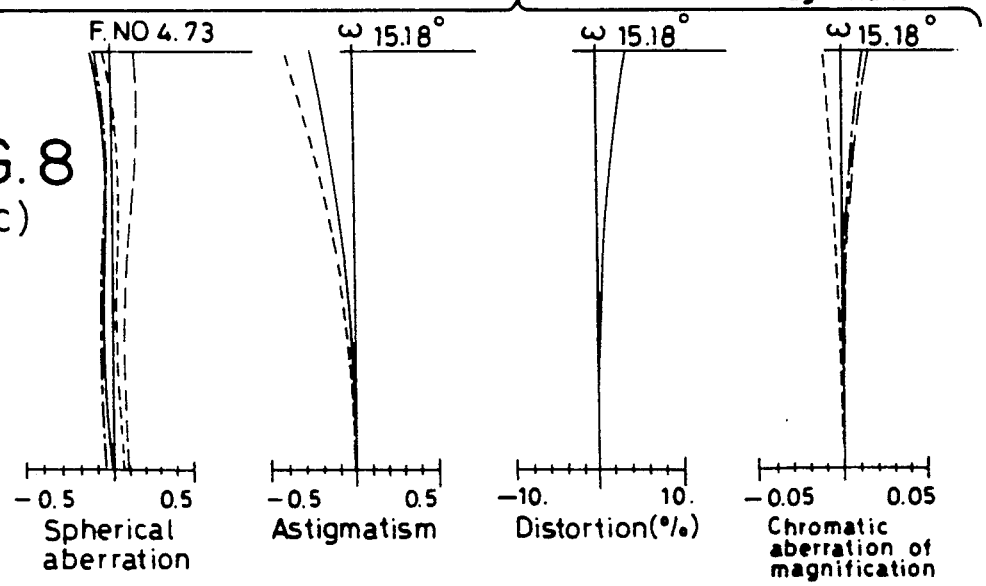

COMPACT, FAST ZOOM LENS SYSTEM

BACKGROUND OF THE INVENTION

The present invention relates generally to a compact zoom lens system suitable for lens shutter cameras, etc., and more particularly to a three-unit or positive/-positive/negative-unit, fast zoom lens system which has a zoom ratio of ca. 2 and a small F-number.

In recent years, lens shutter cameras with built-in zoom lenses have become widely popular, and numerous zoom lenses suitable for lens shutter cameras, etc. have been proposed until now.

For instance, the zoom lenses proposed in Japanese Provisional Patent Publication Nos. 56-128911 and 57-201213 each comprise two or positive and negative lens units. However, when it is intended to correct lens performance well with a two-unit zoom lens, some difficulty is encountered in having a zoom ratio of 2 or more. Especially when it is intended to obtain a small F-number of ca. 3.5 for instance at the wide position, the achievable zoom ratio is of the order of at most 1.5.

For this reason, a number of three-unit zoom lens systems have been proposed as zoom lenses having a zoom ratio of 2 or more. According to Japanese Provisional Patent Publication Nos. Sho. 63-153351 and Hei. 1-252916, zoom lenses having high zoom ratios are achieved by constructing the optical systems of three or positive/positive/negative lens units.

In the three- or positive/positive/negative-unit zoom lenses proposed so far in the art, however, the optical performance is maintained at the expense of the F-number. When the focal length of the total system at the tele position is of the order of 35 mm, the F-number is about 4.5, but this F-number is much more increased in association with zooming to the tele position. In addition, when the focal length of the total system is of the order of 80 mm, the F-number will assume a value of 6 or more.

When it is intended to design a fast zoom lens having a small F-number ith the lens arrangement proposed so far in the art it is imperatively required to diminish the refracting power of each lens. This gives rise to an excessive increase in the size of the lens system, failing to provide a zoom lens suitable for use with a compact camera.

SUMMARY OF THE INVENTION

In view of the foregoing a main object of this invention is to provide a compact, fast, three-unit zoom lens system which has a zoom ratio of ca. 2 but, nonetheless, has a small F-number.

According to one aspect of this invention, there is provided a compact, fast zoom lens system comprising, in order from the object side, a first lens unit having a positive refracting power; a second lens unit including a front subunit having at least one negative lens and a rear subunit having at least one negative lens and at least two positive lenses located more closely to the image side than said negative lens and having a positive refracting power as a whole, said front and rear subunits having a positive composite power; and a third lens unit having a negative refracting power;

said first, second and third lens units including gaps between them, which are variable for zooming from the wide to tele position.

According to another aspect of this invention, there is provided a compact, fast zoom lens system comprising, in order from the object side, a first lens unit having a positive refracting power; a second lens unit including a front subunit having at least one negative lens and a rear subunit having at least one negative lens and at least two positive lenses located more closely to the image side than said negative lens and having a positive refracting power as a whole, said front and rear subunits having a positive composite power; and a third lens unit having a negative refracting power;

said first, second and third lens units including gaps between them, which are variable for zooming from the wide to tele position, and further including a stop between said front and rear subunits.

Preferably, the lens of said rear subunit proximate to the image side has a positive refracting power and conforms to the following condition (1):

$$0.5 < (r_A + r_B)/(r_A - r_B) < 2.0, \quad (1)$$

where $r_A$ is the radius of curvature on the object side of the lens of said rear subunit of said second lens unit located proximately to the image side, and $r_B$ is the radius of curvature on the image side of the lens of said rear subunit of said second lens unit located proximately to the image side Preferably, the zoom lens system also conforms to the following condition (2):

$$-0.55 < f_{2R}/f_{2F} < 0.2, \quad (2)$$

where $f_{2F}$ is the focal length of said front subunit, and $f_{2R}$ is the focal length of said rear subunit.

In what follows, why the lens arrangement mentioned above is used and how it acts will be explained.

As already mentioned, when it is intended to reduce the F-number of a three-unit or positive/positive/negative-unit zoom lens system, it is imperatively required to reduce the refracting power of each lens so as to secure performance. This incurs an increase in the size of the lens system. Especially in the case of this type zoom lens, the size of the second unit increases extremely, because the second unit is longer in the total length and more in the number of lenses than the first and third units.

In order to reduce the total length of the second unit, it is required to increase the refracting power of the rear subunit of the second unit and thereby narrow the space between the front and rear subunits of the second unit. In this case, a major aberrational problem arises in connection with spherical aberration. This spherical aberration is generally balanced and corrected by plus and minus aberrations generated by the front and rear subunits of the second unit, respectively. However, this correction has some difficulty, because the minus spherical aberration generated by the rear subunit is larger than the plus spherical aberration generated by the front subunit as much as the refracting power of the rear subunit is increased. Referring here to the rear subunit of the second unit in more detail, it includes at least one negative lens for correction of on-axial chromatic aberration and a positive lens in the rear thereof, by which some considerable spherical aberration is generated. In this invention, the generation of this spherical aberration is reduced by constructing that positive lens of at least two positive lens components.

In addition, if a stop is located between the front and rear subunits of the second unit, then off axial aberrations are likely to be generated by the lens of the rear subunit proximate to the image side, because on the image side of the rear subunit off-axial luminous flux passes through a position off the optical axis. In the present invention, it is thus required that the lens of the rear subunit of the second unit proximate to the image side conform to the conditional formula (1) mentioned above.

When the lower limit of the conditional formula (1) is not reached, the surface of that lens on the object side takes on a convex surface having a small radius of curvature. Off-axial aberrations, esp., astigmatism generated by this surface are too large to correct. When the upper limit is exceeded, the image-side radius of curvature of the lens of the rear subunit of the second unit proximate to the image side is so reduced that this surface can generate spherical surface too large to correct. For these reasons, the conditional formula (1) should be satisfied.

As already stated, it is also desired that the present zoom lens system conform to the conditional formula (2):

$$-0.55 < f_{2R}/f_{2F} < 0.2, \quad (2)$$

where $f_{2F}$ and $f_{2R}$ are the focal lengths of the front and rear subunits of the second unit, respectively.

Falling short of the lower limit of the conditional formula (2) may be preferred, because the refracting power of the front subunit of the second unit becomes negative and strong and the front and rear subunits of the second unit are well balanced for correction of spherical aberration. However, the inter-unit distance between the front and rear subunits becomes too long. When the upper limit is exceeded, the refracting power of the front subunit of the second unit becomes positive, making it difficult to correct spherical aberration. Besides, since the principal point of the second unit is located so closely to the object side that the interunit distance between the first and second units becomes wide, resulting in an increase in the total length of the zoom lens system.

It is noted that the incorporation of an aspherical surface in the second unit makes correction of spherical aberration easier and the performance and total length of the zoom lens system much better and shorter. In addition, the performance of the zoom lens system is even much more improved by incorporating aspherical surfaces in the first and third units, thereby correcting off-axial aberrations in particular.

Still other objects and advantages of the invention will in part be obvious and will in part be apparent from the specification.

The invention accordingly comprises the features of construction, combinations of elements, and arrangement of parts which will be exemplified in the construction set forth, and the scope of the invention will be indicated in the claims.

DESCRIPTION OF THE PREFERRED EMBODIMENTS

In the following description, some examples of the zoom lens according to this invention will be explained more specifically.

Figure 1:
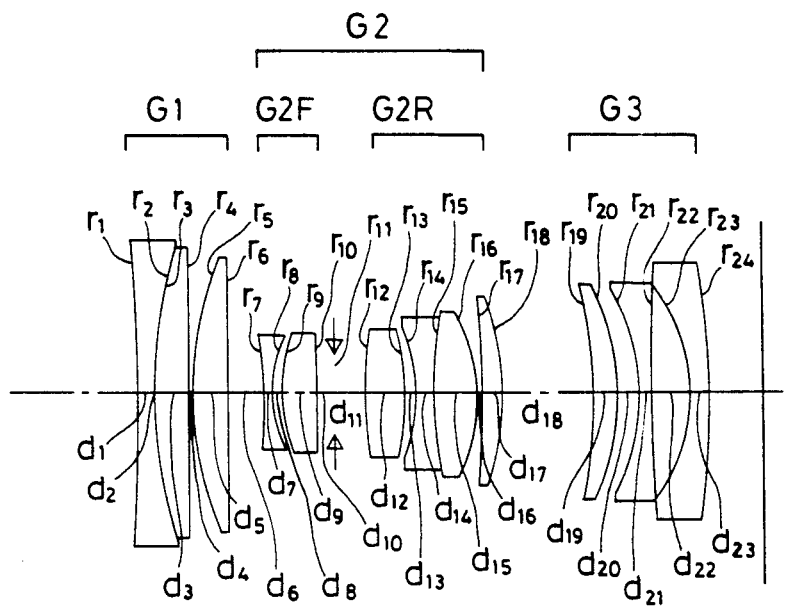
FIGS. 1(a) and 1(b) represent in section the zoom lens system of Example 1 according to this invention at the (a) wide and (b) tele positions.
Figure 1:
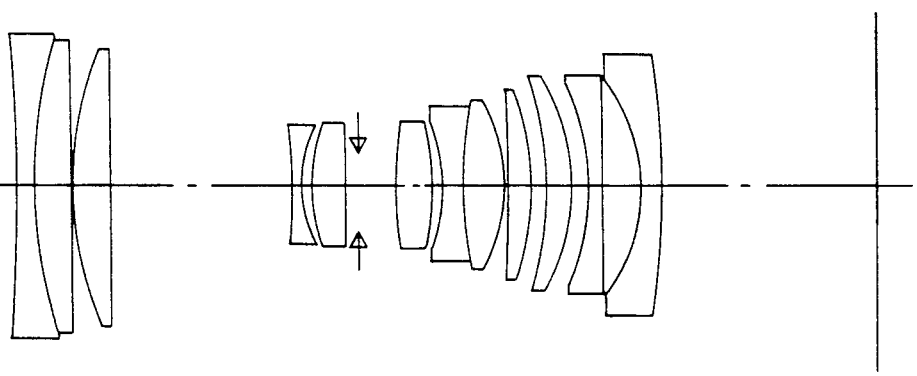
Figure 2:
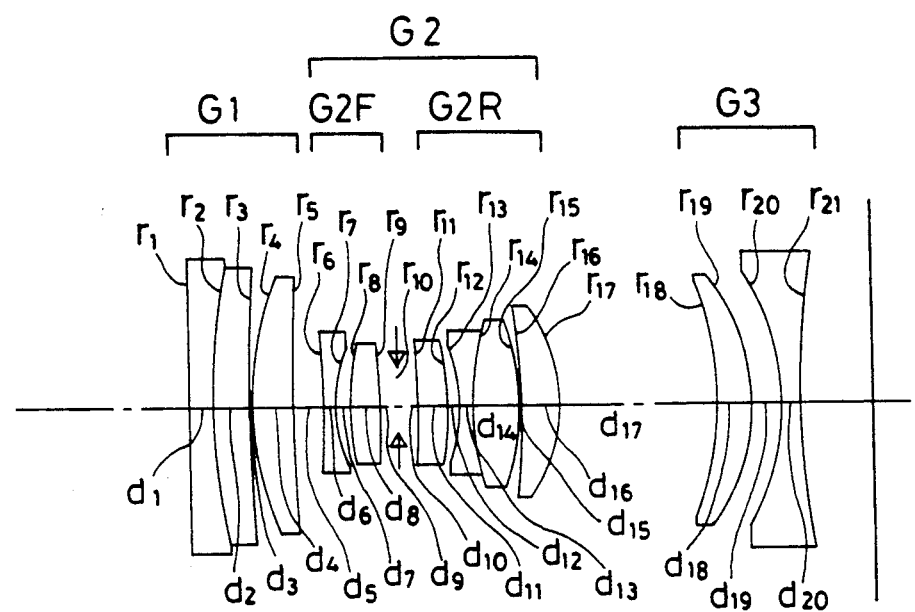
FIG. 2 represents in section the zoom lens system of Example 2 at the wide position.
Figure 3:
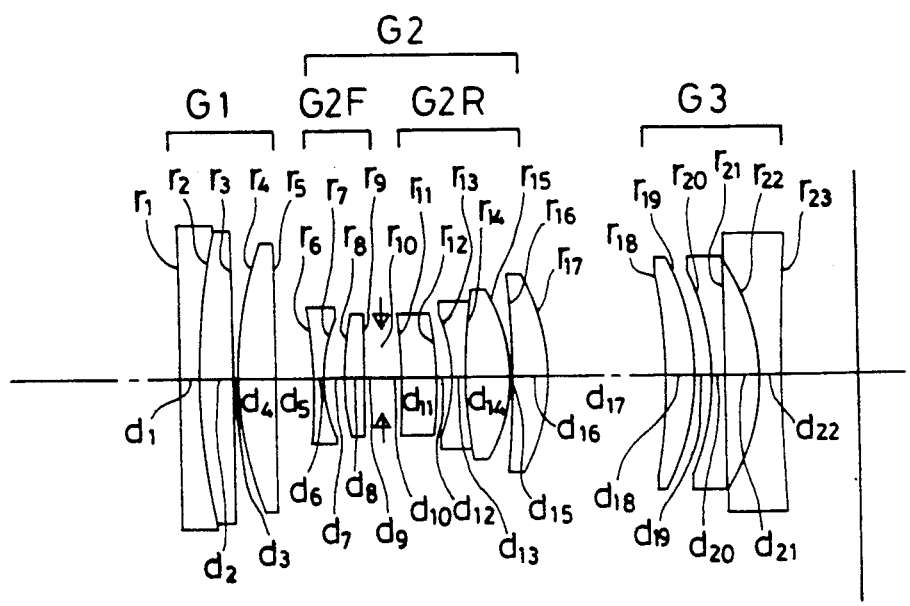
FIG. 3 represents in section the zoom lens system of Example 3 at the wide position.
Figure 4:
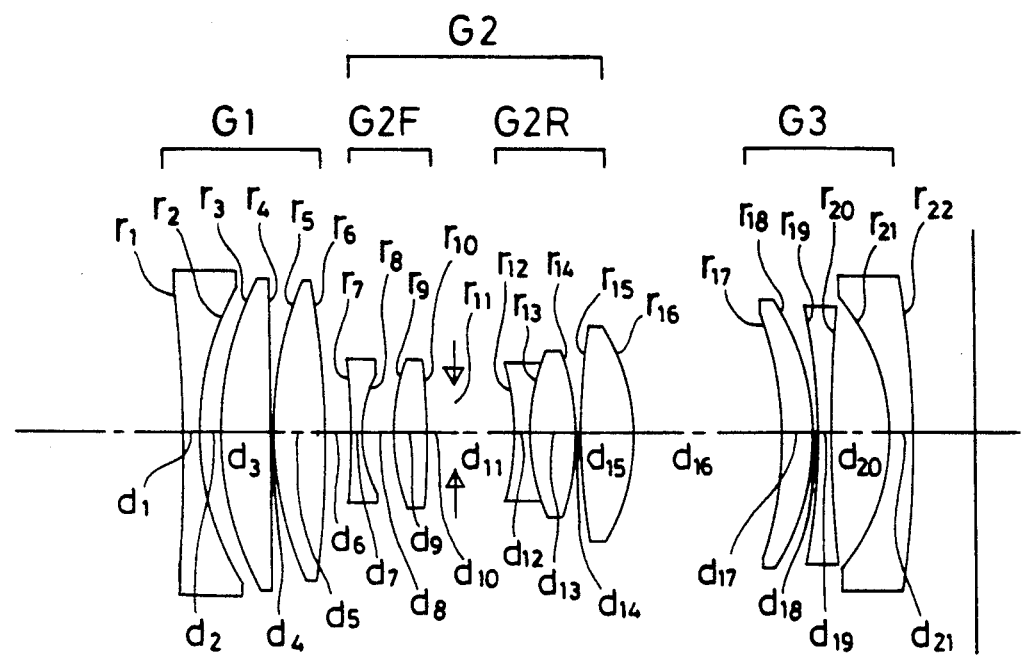
FIG. 4 represents in section the zoom lens system of Example 4 at the wide position.
Figure 5:
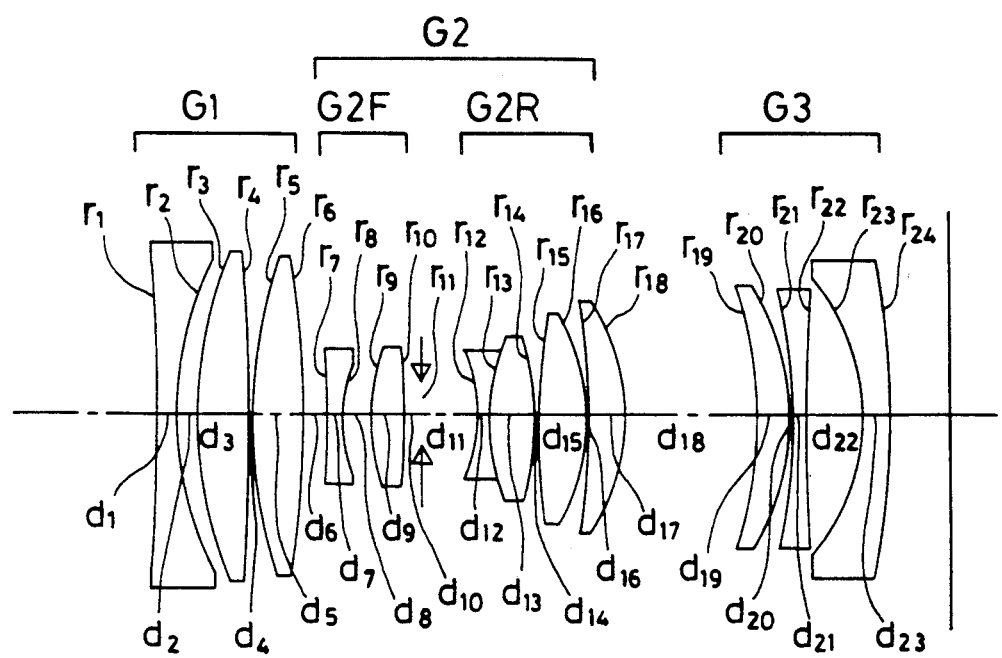
FIG. 5 represents in section the zoom lens system of Example 5 at the wide position.
Figure 6:
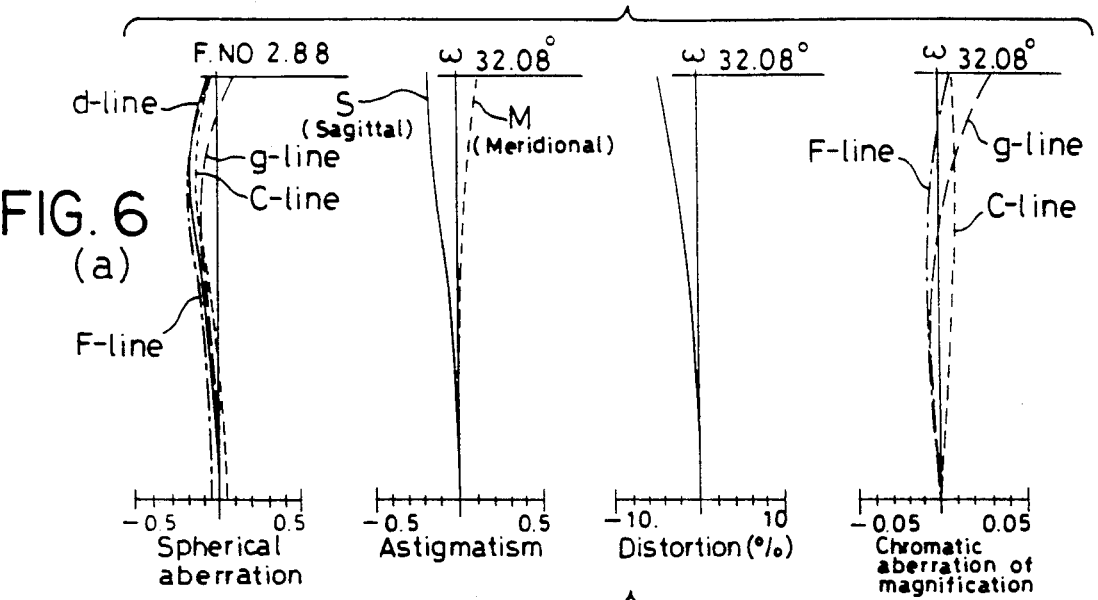
FIGS. 6(a)-6(c) are aberration diagrams showing the spherical aberration, astigmatism, distortion and chromatic aberration of magnification of Example 1 at the (a) wide, (b) standard and (c) tele positions.
Figure 6:
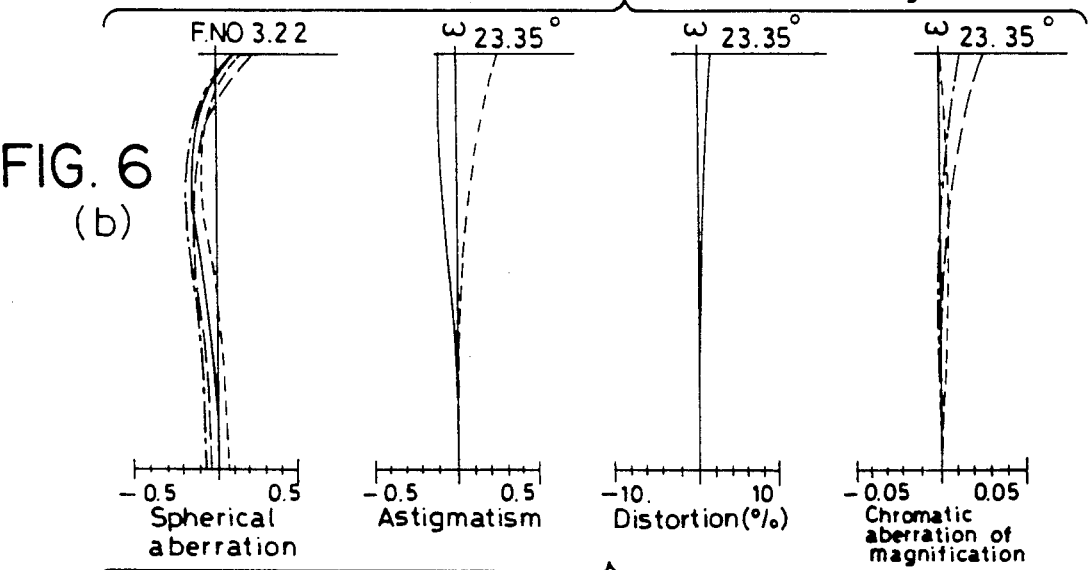
Figure 6:
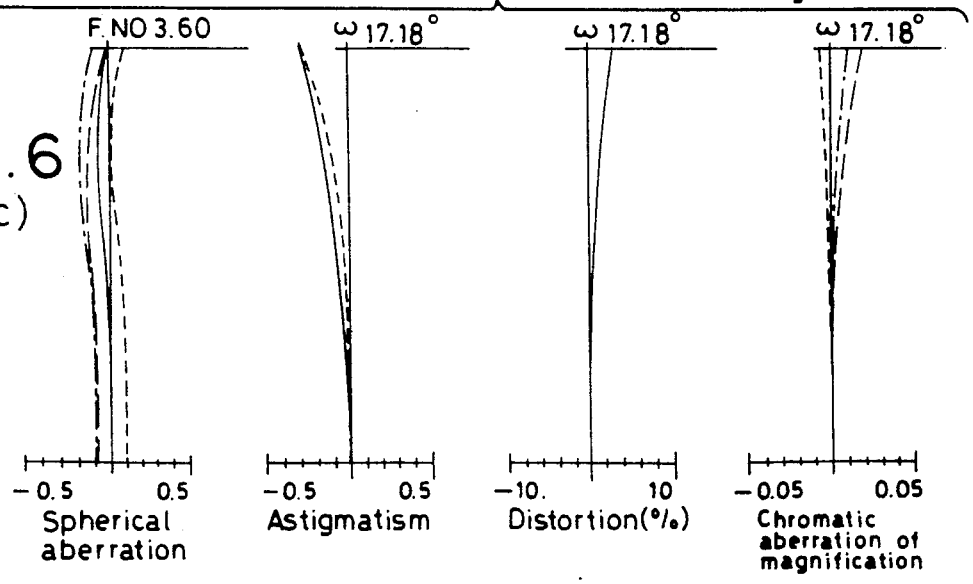
Figure 7:
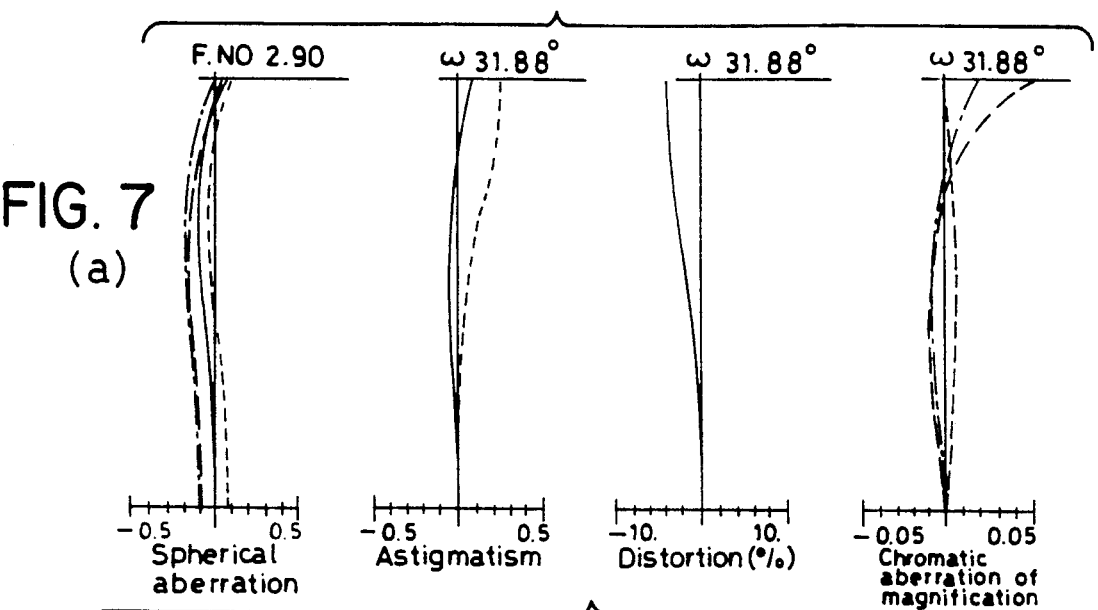
FIGS. 7(a)-7(c) are aberration diagrams of Example 2, similar to FIGS. 6(a)-6(c), FIGS. 8(a)-8(c) are aberration diagrams of Example 3, similar to FIGS. 6(a)-6(c), FIGS. 9(a)-9(c) are aberration diagrams of Example 4, similar to FIGS. 6(a)-6(c), FIGS. 10(a)-10(c) are aberration diagrams of Example 5, similar to FIGS. 6(a)-6(c).
Figure 7:
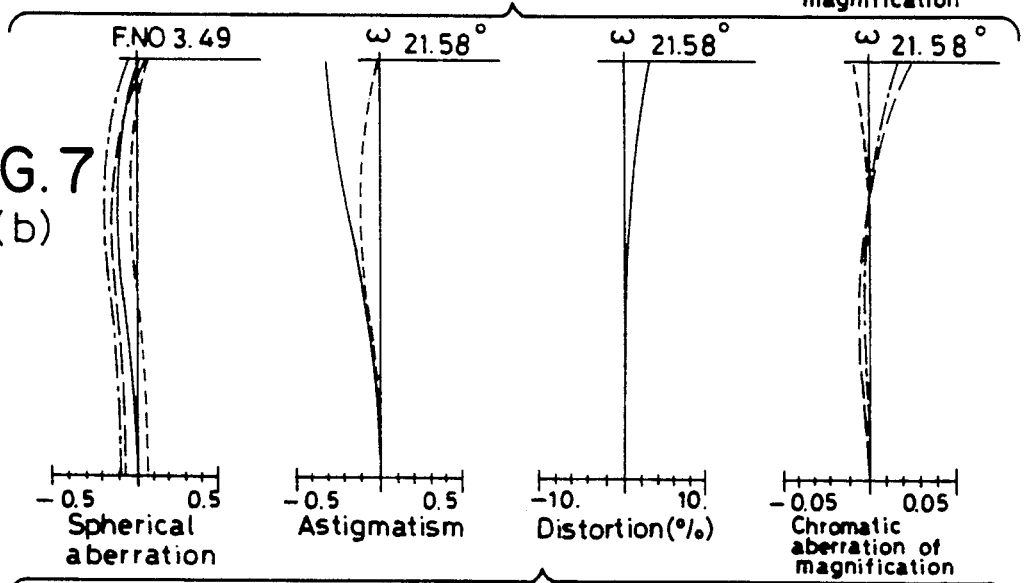
Figure 7:
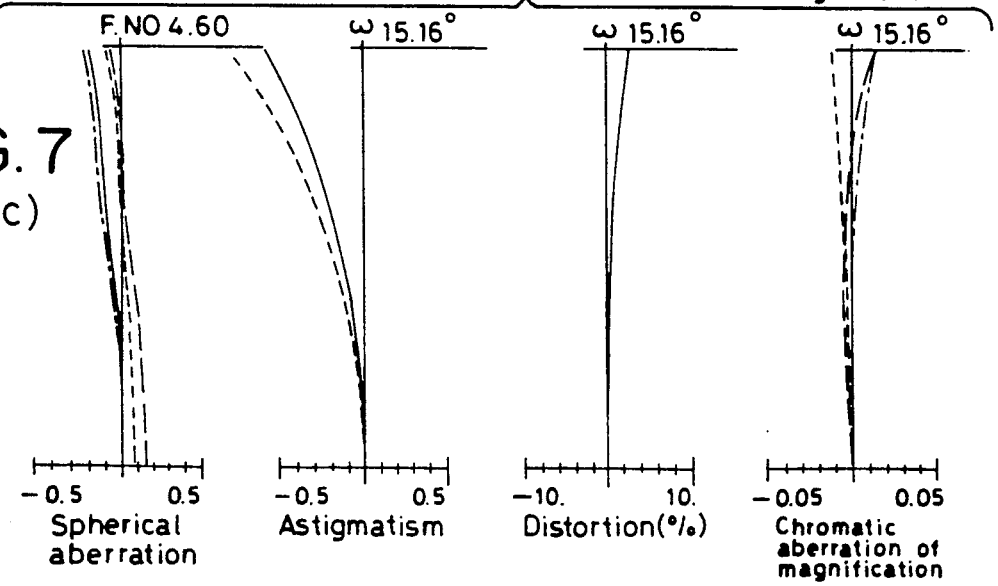
Figure 9:
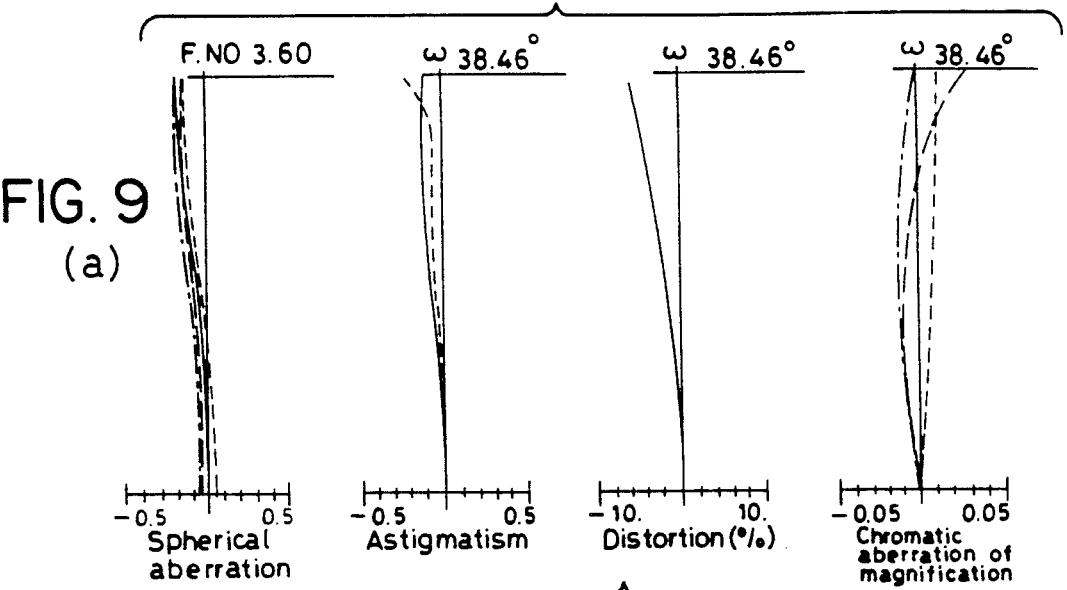
Figure 9:
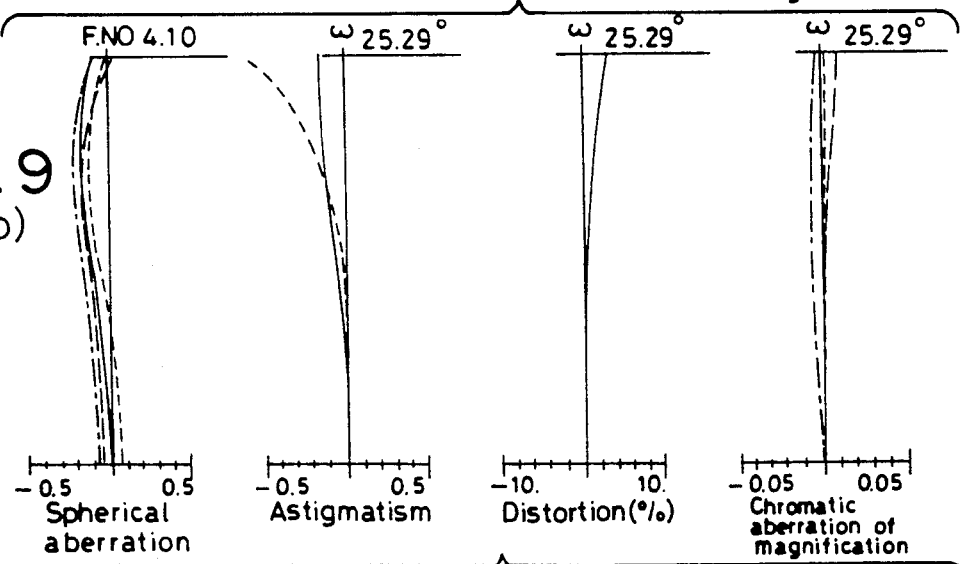
Figure 9:
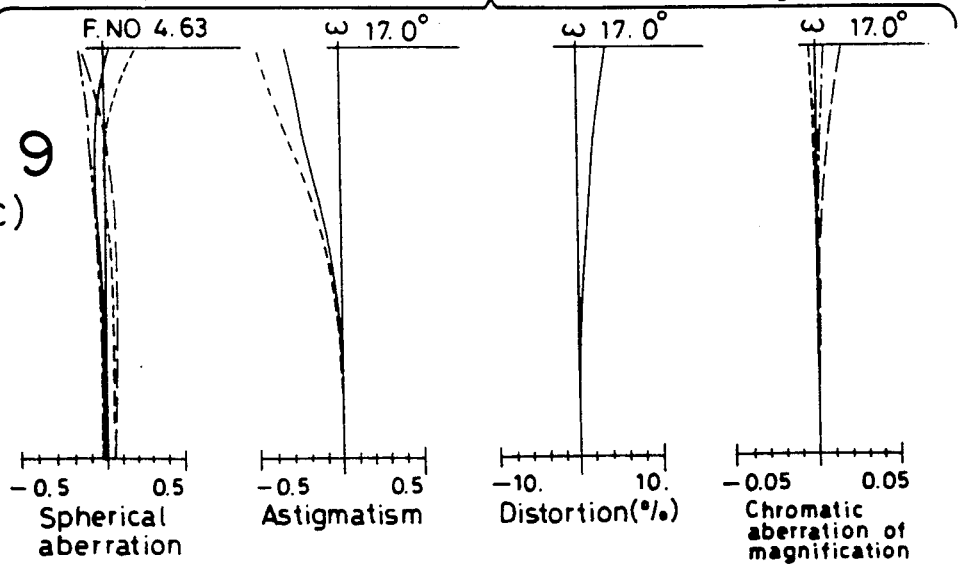
Figure 10:
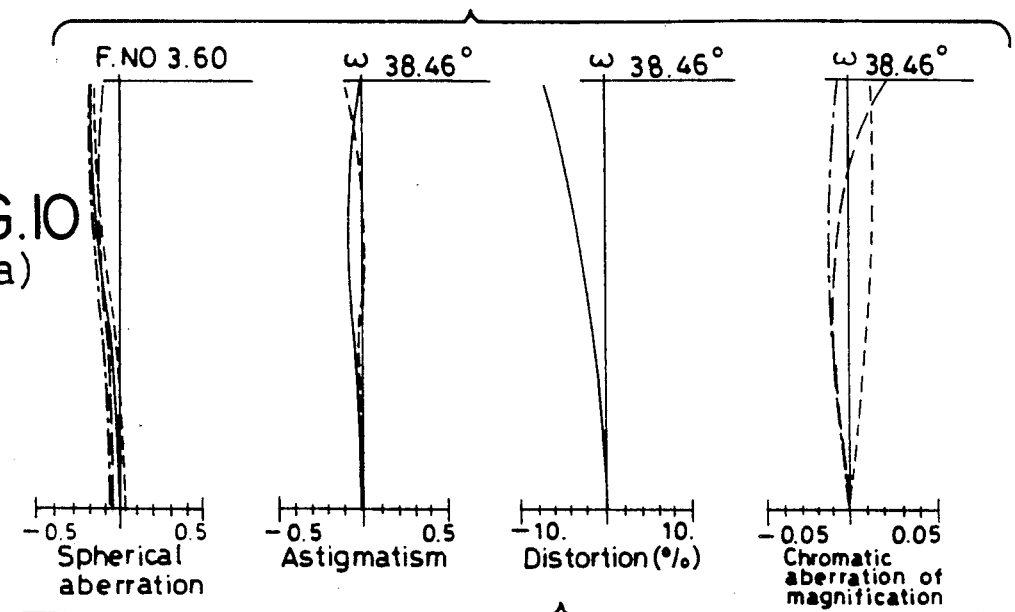
Figure 10:
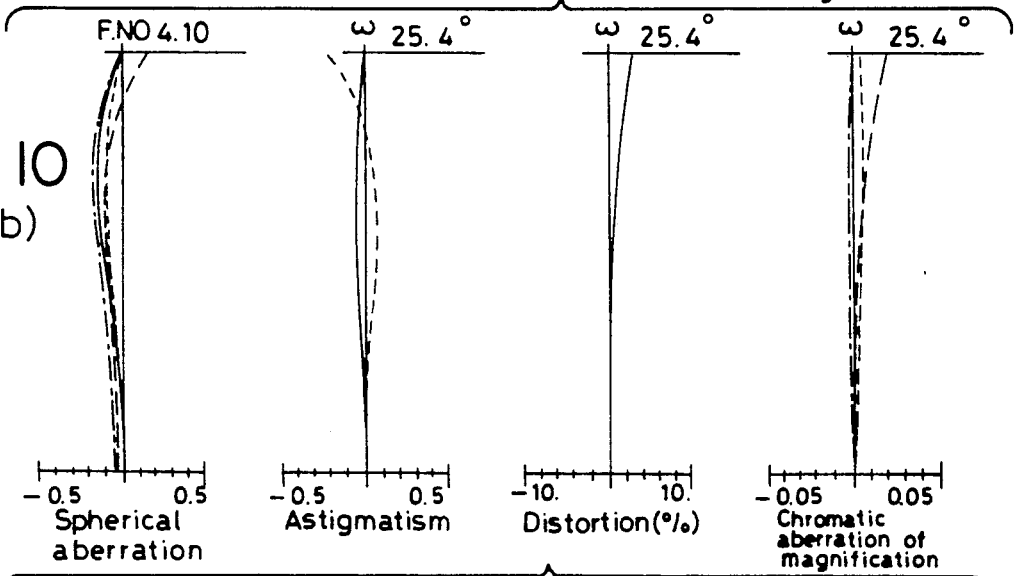
Figure 10:
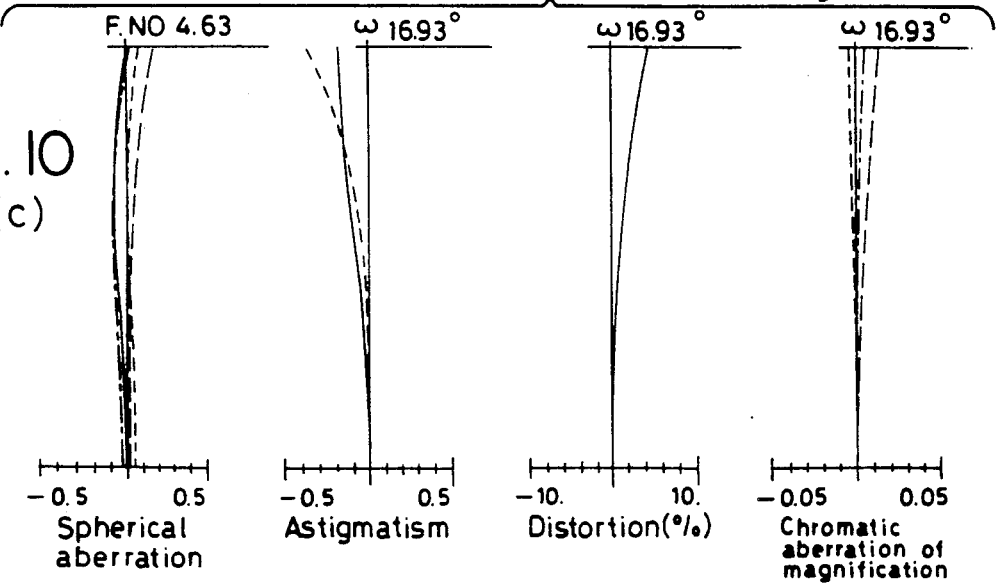

Note that the lens data of the examples will be given later. The sections of the lens arrangement of Example 1 at the (a) wide and (b) tele positions are shown in FIG. 1, and the sections of the lens arrangements of Examples 2–5 at the wide positions are shown in FIGS. 2–5, respectively.

Referring to the lens arrangement of each unit, the first unit G1 comprises in Example 1 a double-concave negative lens and two positive meniscus lenses, three in all; in Example 2 or 3 a cemented lens of a double concave negative lens and a positive meniscus lens and a positive meniscus lens, three in all; in Example 4 a double-concave negative lens, a positive meniscus lens and a double-convex lens, three in all; and in Example 5 a double-concave lens and two double-convex positive lenses, three in all.

In each example, the front subunit G2F of the second unit G2 comprises a double-concave negative lens and a double-convex positive lens, two in all. The rear subunit G2R of the second unit G2 comprises in Example 1 a double-convex positive lens, a cemented lens of a double-concave negative lens and a double-convex positive lens and a positive meniscus lens, four in all; in Example 2 or 3 a positive meniscus lens, a cemented lens of a double-concave negative lens and a double-convex positive lens and a positive meniscus lens, four in all; in Example 4 a cemented lens of a double-concave negative lens and a double-convex positive lens and a double-convex positive lens, three in all; and in Example 5 a cemented lens of a double-concave negative lens and a double convex positive lens, a double-convex positive lens and a positive meniscus lens, four in all.

The third unit G3 comprises in Example 1 or 5 a positive meniscus lens and two negative meniscus lenses, three in all; in Example 2 a positive meniscus lens and a double-convex negative lens, two in all; in Example 3 a positive meniscus lens, a negative meniscus lens and a double-concave negative lens, three in all; and in Example 4 a positive meniscus lens, a double-concave negative lens and a negative meniscus lens, three in all. Thus, the zoom lens system of Example 1, 3 or 5 comprises 12 lenses in all and that of Examples 2 or 4 comprises 11 lenses in all.

In each example, one aspherical surface is applied to the image-side surface of the positive lens of the rear subunit G2R of the second unit proximate to the object side.

It is noted that the symbols used hereinafter but not referred to hereinbefore mean:

f: focal length of the total system
$F_{NO}$: F-number
$\omega$: half field angle
$f_B$: back focus
$r_1, r_2, \ldots$: radii of curvature of the lens surfaces
$d_1, d_2, \ldots$: separation between adjacent lens surfaces
$n_{d1}, n_{d2}, \ldots$: d-line refractive indices of the lenses
$\nu_{d1}, \nu_{d2}, \ldots$: Abbe's number of the lenses Here let x denote the optical axis direction and y denote the direction normal to the optical axis, then aspherical configuration is expressed by the following formula:

$$x = Cy^2/\{1+(1-(C^2y^2)^{\frac{1}{2}}\} + A_4y^4 + A_6y^6 + A_8y^8 + A_{10}y^{10},$$

provided that $C = 1/r$, r is the radius of curvature on the optical axis and $A_4, A_6, A_8$ and $A_{10}$ are aspher1cal coefficients.

EXAMPLE 1

$f = 36.0 \sim 49.5 \sim 68.2$
$F_{NO} = 2.88 \sim 3.22 \sim 3.60$
$\omega = 32.08 \sim 23.35 \sim 17.18°$
$f_B = 7.08 \sim 16.1 \sim 27.54$

| | | | |
|---|---|---|---|
| $r_1 = -800.000$ | $d_1 = 2.400$ | $n_{d1} = 1.68893$ | $\nu_{d1} = 31.08$ |
| $r_2 = 61.241$ | $d_2 = 0.255$ | | |
| $r_3 = 66.830$ | $d_3 = 4.600$ | $n_{d2} = 1.60311$ | $\nu_{d2} = 60.70$ |
| $r_4 = 1601.373$ | $d_4 = 0.200$ | | |
| $r_5 = 47.535$ | $d_5 = 4.500$ | $n_{d3} = 1.65830$ | $\nu_{d3} = 57.33$ |
| $r_6 = 2166.091$ | $d_6 = $ (Variable) | | |
| $r_7 = -53.803$ | $d_7 = 1.300$ | $n_{d4} = 1.77250$ | $\nu_{d4} = 49.66$ |
| $r_8 = 18.861$ | $d_8 = 0.750$ | | |
| $r_9 = 22.986$ | $d_9 = 4.916$ | $n_{d5} = 1.80518$ | $\nu_{d5} = 25.43$ |
| $r_{10} = -773.166$ | $d_{10} = 1.500$ | | |
| $r_{11} = \infty$ (Stop) | $d_{11} = 4.552$ | | |
| $r_{12} = 55.930$ | $d_{12} = 5.000$ | $n_{d6} = 1.58913$ | $\nu_{d6} = 61.18$ |
| $r_{13} = -29.993$ | $d_{13} = 1.600$ | | |
| (Aspheric) | | | |
| $r_{14} = -20.326$ | $d_{14} = 2.312$ | $n_{d7} = 1.78472$ | $\nu_{d7} = 25.68$ |
| $r_{15} = 64.526$ | $d_{15} = 5.494$ | $n_{d8} = 1.69680$ | $\nu_{d8} = 55.52$ |
| $r_{16} = -20.043$ | $d_{16} = 0.200$ | | |
| $r_{17} = -156.451$ | $d_{17} = 3.011$ | $n_{d9} = 1.60311$ | $\nu_{d9} = 60.70$ |
| $r_{18} = -32.017$ | $d_{18} = $ (Variable) | | |
| $r_{19} = -55.646$ | $d_{19} = 3.500$ | $n_{d10} = 1.80518$ | $\nu_{d10} = 25.43$ |
| $r_{20} = -26.780$ | $d_{20} = 2.463$ | | |
| $r_{21} = -28.784$ | $d_{21} = 1.800$ | $n_{d11} = 1.69680$ | $\nu_{d11} = 55.52$ |
| $r_{22} = -660.853$ | $d_{22} = 4.960$ | | |
| $r_{23} = -22.140$ | $d_{23} = 2.100$ | $n_{d12} = 1.72916$ | $\nu_{d12} = 54.68$ |
| $r_{24} = -112.630$ | | | |

Zooming Speces

| f | 36.0 | 49.5 | 68.2 |
|---|---|---|---|
| $d_6$ | 4.600 | 14.803 | 23.671 |
| $d_{18}$ | 11.341 | 6.164 | 1.614 |

Aspherical Coefficients
13th surface
$A_4 = 2.7011 \times 10^{-5}$
$A_6 = 5.3504 \times 10^{-9}$
$A_8 = 1.0223 \times 10^{-9}$
$A_{10} = -3.5508 \times 10^{-12}$
$(r_A + r_B)/(r_A - r_B) = 1.51$
$f_{2R}/f_{2F} = -0.45$

EXAMPLE 2

$f = 36.2 \sim 52.9 \sim 77.2$
$F_{NO} = 2.90 \sim 3.49 \sim 4.60$
$\omega = 31.88 \sim 21.58 \sim 15.16°$
$f_B = 8.31 \sim 20.05 \sim 40.40$

| | | | |
|---|---|---|---|
| $r_1 = \infty$ | $d_1 = 2.500$ | $n_{d1} = 1.78472$ | $\nu_{d1} = 25.68$ |
| $r_2 = 67.225$ | $d_2 = 4.100$ | $n_{d2} = 1.61405$ | $\nu_{d2} = 54.95$ |
| $r_3 = 237.641$ | $d_3 = 0.200$ | | |
| $r_4 = 34.228$ | $d_4 = 4.800$ | $n_{d3} = 1.69680$ | $\nu_{d3} = 56.49$ |
| $r_5 = 407.736$ | $d_5 = $ (Variable) | | |
| $r_6 = -47.492$ | $d_6 = 1.100$ | $n_{d4} = 1.72916$ | $\nu_{d4} = 54.68$ |
| $r_7 = 16.774$ | $d_7 = 1.601$ | | |
| $r_8 = 24.127$ | $d_8 = 3.500$ | $n_{d5} = 1.80518$ | $\nu_{d5} = 25.43$ |
| $r_9 = -95.068$ | $d_9 = 2.000$ | | |
| $r_{10} = \infty$ (Stop) | $d_{10} = 2.000$ | | |
| $r_{11} = -149.985$ | $d_{11} = 3.500$ | $n_{d6} = 1.58913$ | $\nu_{d6} = 61.68$ |
| $r_{12} = -28.924$ | $d_{12} = 1.200$ | | |
| (Aspheric) | | | |
| $r_{13} = -24.694$ | $d_{13} = 1.600$ | $n_{d7} = 1.78472$ | $\nu_{d7} = 25.68$ |
| $r_{14} = 34.573$ | $d_{14} = 5.300$ | $n_{d8} = 1.61272$ | $\nu_{d8} = 58.75$ |
| $r_{15} = -26.622$ | $d_{15} = 0.200$ | | |
| $r_{16} = -76.103$ | $d_{16} = 4.000$ | $n_{d9} = 1.69680$ | $\nu_{d9} = 56.49$ |
| $r_{17} = -19.077$ | $d_{17} = $ (Variable) | | |
| $r_{18} = -33.416$ | $d_{18} = 3.242$ | $n_{d10} = 1.78472$ | $\nu_{d10} = 25.68$ |
| $r_{19} = -24.560$ | $d_{19} = 3.839$ | | |
| $r_{20} = -25.011$ | $d_{20} = 2.100$ | $n_{d11} = 1.72916$ | $\nu_{d11} = 54.68$ |
| $r_{21} = 96.031$ | | | |

Zooming Speces

| f | 36.2 | 52.9 | 77.2 |
|---|---|---|---|
| $d_5$ | 3.500 | 14.032 | 18.789 |
| $d_{17}$ | 17.509 | 9.651 | 2.500 |

Aspherical Coefficients
12th surface
$A_4 = 4.2078 \times 10^{-5}$
$A_6 = 4.7849 \times 10^{-8}$
$A_8 = 2.0427 \times 10^{-9}$
$A_{10} = -1.8664 \times 10^{-11}$
$(r_A + r_B)/(r_A - r_B) = 1.67$
$f_{2R}/f_{2F} = -0.37$

EXAMPLE 3

$f = 36.2 \sim 52.9 \sim 77.2$
$F_{NO} = 2.90 \sim 3.55 \sim 4.73$
$\omega = 31.26 \sim 21.5 \sim 15.18°$
$f_B = 8.29 \sim 18.0 \sim 34.69$

| | | | |
|---|---|---|---|
| $r_1 = \infty$ | $d_1 = 2.200$ | $n_{d1} = 1.78472$ | $\nu_{d1} = 25.68$ |
| $r_2 = 85.519$ | $d_2 = 3.700$ | $n_{d2} = 1.58913$ | $\nu_{d2} = 61.18$ |
| $r_3 = 2436.379$ | $d_3 = 0.200$ | | |
| $r_4 = 35.920$ | $d_4 = 4.500$ | $n_{d3} = 1.56873$ | $\nu_{d3} = 63.16$ |
| $r_5 = 574.778$ | $d_5 = $ (Variable) | | |
| $r_6 = -49.356$ | $d_6 = 1.100$ | $n_{d4} = 1.72916$ | $\nu_{d4} = 54.68$ |
| $r_7 = 18.495$ | $d_7 = 2.027$ | | |
| $r_8 = 24.760$ | $d_8 = 2.500$ | $n_{d5} = 1.80518$ | $\nu_{d5} = 25.43$ |
| $r_9 = -151.234$ | $d_9 = 2.000$ | | |
| $r_{10} = \infty$ (Stop) | $d_{10} = 2.000$ | | |
| $r_{11} = -567.531$ | $d_{11} = 4.000$ | $n_{d6} = 1.53172$ | $\nu_{d6} = 48.90$ |
| $r_{12} = -27.759$ | $d_{12} = 1.432$ | | |
| (Aspheric) | | | |
| $r_{13} = -19.077$ | $d_{13} = 1.600$ | $n_{d7} = 1.80518$ | $\nu_{d7} = 25.43$ |
| $r_{14} = 58.976$ | $d_{14} = 5.080$ | $n_{d8} = 1.60311$ | $\nu_{d8} = 60.70$ |
| $r_{15} = -19.015$ | $d_{15} = 0.200$ | | |
| $r_{16} = -242.238$ | $d_{16} = 4.285$ | $n_{d9} = 1.61700$ | $\nu_{d9} = 62.79$ |
| $r_{17} = -20.359$ | $d_{17} = $ (Variable) | | |
| $r_{18} = -61.608$ | $d_{18} = 3.200$ | $n_{d10} = 1.71736$ | $\nu_{d10} = 29.51$ |
| $r_{19} = -26.124$ | $d_{19} = 1.731$ | | |
| $r_{20} = -34.091$ | $d_{20} = 1.800$ | $n_{d11} = 1.72916$ | $\nu_{d11} = 54.68$ |
| $r_{21} = -340.771$ | $d_{21} = 4.004$ | | |
| $r_{22} = -21.489$ | $d_{22} = 2.100$ | $n_{d12} = 1.69680$ | $\nu_{d12} = 55.52$ |
| $r_{23} = 912.716$ | | | |

Zooming Speces

| f | 36.2 | 52.9 | 77.2 |
|---|---|---|---|
| $d_5$ | 4.500 | 15.315 | 20.235 |
| $d_{17}$ | 12.623 | 7.026 | 2.000 |

Aspherical Coefficients
12th surface
$A_4 = 5.5788 \times 10^{-5}$
$A_6 = 1.8165 \times 10^{-7}$
$A_8 = 2.0219 \times 10^{-10}$
$A_{10} = 6.2863 \times 10^{-12}$
$(r_A + r_B)/(r_A - r_B) = 1.18$ $f_{2R}/f_{2F} = -0.32$

EXAMPLE 4

$f = 28.95 \sim 44.32 \sim 68.19$
$F_{NO} = 3.60 \sim 4.10 \sim 4.63$
$\omega = 38.46 \sim 25.29 \sim 17.0°$
$f_B = 6.64 \sim 21.74 \sim 42.66$

| | | |
|---|---|---|
| $r_1 = -800.000$ | $d_1 = 2.300$ | $n_{d1} = 1.83400 \; \nu_{d1} = 37.16$ |
| $r_2 = 32.873$ | $d_2 = 2.164$ | |
| $r_3 = 36.376$ | $d_3 = 5.327$ | $n_{d2} = 1.51633 \; \nu_{d2} = 64.15$ |
| $r_4 = 7892.397$ | $d_4 = 0.200$ | |
| $r_5 = 46.254$ | $d_5 = 5.680$ | $n_{d3} = 1.62230 \; \nu_{d3} = 53.20$ |
| $r_6 = -97.767$ | $d_6 = $ (Variable) | |
| $r_7 = -76.115$ | $d_7 = 1.300$ | $n_{d4} = 1.72916 \; \nu_{d4} = 54.68$ |
| $r_8 = 14.973$ | $d_8 = 3.315$ | |
| $r_9 = 22.917$ | $d_9 = 3.600$ | $n_{d5} = 1.76182 \; \nu_{d5} = 26.52$ |
| $r_{10} = -58.481$ | $d_{10} = 3.000$ | |
| $r_{11} = \infty$ (Stop) | $d_{11} = 6.608$ | |
| $r_{12} = -26.430$ | $d_{12} = 1.214$ | $n_{d6} = 1.78472 \; \nu_{d6} = 25.68$ |
| $r_{13} = 23.375$ | $d_{13} = 5.341$ | $n_{d7} = 1.58913 \; \nu_{d7} = 61.18$ |
| $r_{14} = -23.179$ (Aspheric) | $d_{14} = 0.200$ | |
| $r_{15} = 69.729$ | $d_{15} = 6.291$ | $n_{d8} = 1.56873 \; \nu_{d8} = 63.16$ |
| $r_{16} = -19.592$ | $d_{16} = $ (Variable) | |
| $r_{17} = -46.811$ | $d_{17} = 3.500$ | $n_{d9} = 1.80518 \; \nu_{d9} = 25.43$ |
| $r_{18} = -27.290$ | $d_{18} = 0.200$ | |
| $r_{19} = -83.026$ | $d_{19} = 1.880$ | $n_{d10} = 1.77250 \; \nu_{d10} = 49.66$ |
| $r_{20} = 334.950$ | $d_{20} = 6.427$ | |
| $r_{21} = -19.299$ | $d_{21} = 2.100$ | $n_{d11} = 1.72916 \; \nu_{d11} = 54.68$ |
| $r_{22} = -112.630$ | | |

Zooming Speces

| f | 28.95 | 44.32 | 68.19 |
|---|---|---|---|
| $d_6$ | 3.000 | 14.614 | 24.952 |
| $d_{16}$ | 15.249 | 7.588 | 1.614 |

Aspherical Coefficients
14th surface
$A_4 = 2.2122 \times 10^{-5}$
$A_6 = 7.3888 \times 10^{-8}$
$A_8 = 4.4143 \times 10^{-10}$
$A_{10} = -2.0132 \times 10^{-12}$
$(r_A + r_B)/(r_A - r_B) = 0.56$
$f_{2R}/f_{2F} = -0.07$

EXAMPLE 5

$f = 29.10 \sim 44.31 \sim 68.17$
$F_{NO} = 3.60 \sim 4.10 \sim 4.63$
$\omega = 38.46 \sim 25.4 \sim 16.93°$
$f_B = 6.45 \sim 20.97 \sim 39.35$

| | | |
|---|---|---|
| $r_1 = -800.000$ | $d_1 = 2.300$ | $n_{d1} = 1.83400 \; \nu_{d1} = 37.16$ |
| $r_2 = 36.570$ | $d_2 = 2.099$ | |
| $r_3 = 39.897$ | $d_3 = 5.510$ | $n_{d2} = 1.51633 \; \nu_{d2} = 64.15$ |
| $r_4 = -597.969$ | $d_4 = 0.200$ | |
| $r_5 = 49.018$ | $d_5 = 5.558$ | $n_{d3} = 1.62230 \; \nu_{d3} = 53.20$ |
| $r_6 = -117.434$ | $d_6 = $ (Variable) | |
| $r_7 = -52.214$ | $d_7 = 1.300$ | $n_{d4} = 1.72916 \; \nu_{d4} = 54.68$ |
| $r_8 = 16.799$ | $d_8 = 3.260$ | |
| $r_9 = 23.685$ | $d_9 = 3.647$ | $n_{d5} = 1.78472 \; \nu_{d5} = 25.68$ |
| $r_{10} = -43.345$ | $d_{10} = 1.825$ | |
| $r_{11} = \infty$ (Stop) | $d_{11} = 5.801$ | |
| $r_{12} = -19.169$ | $d_{12} = 1.308$ | $n_{d6} = 1.78472 \; \nu_{d6} = 25.68$ |
| $r_{13} = 20.527$ | $d_{13} = 5.278$ | $n_{d7} = 1.58913 \; \nu_{d7} = 61.18$ |
| $r_{14} = -24.131$ (Aspheric) | $d_{14} = 0.200$ | |
| $r_{15} = 105.845$ | $d_{15} = 5.156$ | $n_{d8} = 1.51633 \; \nu_{d8} = 64.15$ |
| $r_{16} = -21.946$ | $d_{16} = 0.199$ | |
| $r_{17} = -76.006$ | $d_{17} = 3.707$ | $n_{d9} = 1.51633 \; \nu_{d9} = 64.15$ |
| $r_{18} = -23.836$ | $d_{18} = $ (Variable) | |
| $r_{19} = -44.045$ | $d_{19} = 3.500$ | $n_{d10} = 1.80518 \; \nu_{d10} = 25.43$ |
| $r_{20} = -25.625$ | $d_{20} = 0.200$ | |
| $r_{21} = -60.581$ | $d_{21} = 1.880$ | $n_{d11} = 1.77250 \; \nu_{d11} = 49.66$ |
| $r_{22} = -2605.015$ | $d_{22} = 6.460$ | |
| $r_{23} = -18.782$ | $d_{23} = 2.100$ | $n_{d12} = 1.72916 \; \nu_{d12} = 54.68$ |
| $r_{24} = -112.630$ | | |

Zooming Speces

| f | 29.10 | 44.31 | 68.17 |
|---|---|---|---|
| $d_6$ | 3.000 | 14.198 | 26.490 |
| $d_{18}$ | 14.506 | 7.206 | 1.614 |

Aspherical Coefficients
14th surface
$A_4 = 2.2286 \times 10^{-5}$
$A_6 = 9.7844 \times 10^{-8}$
$A_8 = 2.9158 \times 10^{-10}$
$A_{10} = 4.8489 \times 10^{-12}$
$(r_A + r_B)/(r_A - r_B) = 1.91$
$f_{2R}/f_{2F} = -0.13$ The spherical aberrations, astigmatisms, distortions and chromatic aberrations of magnification of Examples 1-5 at the (a) wide, (b) standard and (c) tele positions are shown in the aberration diagrams of FIGS. 6(a)-10(c).

As explained above, the present invention provides a fast zoom lens system which has a zoom ratio of 2 or more and a small F-number and is made compact but, nonetheless, is of high performance.

What we claim is:

1. A zoom lens system comprising, in order from the object side:
   a first lens unit having a positive refractive power;
   a second lens unit including:
      a front subunit having at least one negative lens; and
      a rear subunit having at least one negative lens and at least two positive lenses, wherein said at least two positive lenses are disposed closer to the image side than said negative lens of the rear subunit and wherein said rear subunit has a positive refracting power as a whole,
   said front and rear subunits having a positive composite power; and
   a third lens unit having a negative refracting power;
   said first, second and third lens units having spaces therebetween, said spaces being variable while the space between said front and rear subunits remains fixed during zooming from the wide-angle end to the telephoto end; and
   further including a stop between said front and said rear subunits.

2. A zoom lens system as claimed in claim 1, wherein the lens of said rear subunit proximate to the image side has a positive refracting power and satisfies the following condition (1):

$$0.5 < (r_A + r_B)/(r_A - r_B) < 2.0, \qquad (1)$$

where
   $r_A$ is the radius of curvature on the object side of the lens of said rear subunit of said second lens unit located proximately to the image side, and
   $r_B$ is the radius of curvature on the image side of the lens of said rear subunit of said second lens unit located proximately to the image side.

3. A zoom lens system as claimed in claim 1, which satisfies the following condition (2):

$$-0.55 < f_{2R}/f_{2R} < 0.2, \qquad (2)$$

where
   $f_{2F}$ is the focal length of said front subunit, and
   $f_{2R}$ is the focal length of said rear subunit.

* * * * *